(No Model.)
C. W. BALDWIN.
GOVERNOR FOR ELEVATORS.
No. 261,652. Patented July 25, 1882.
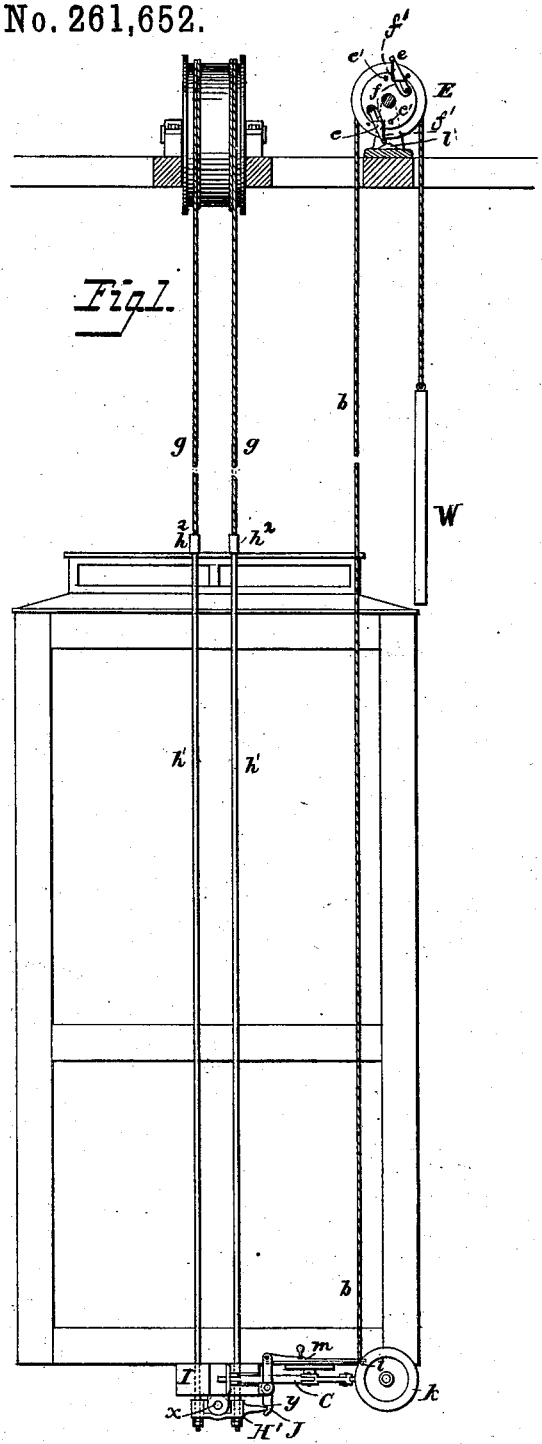
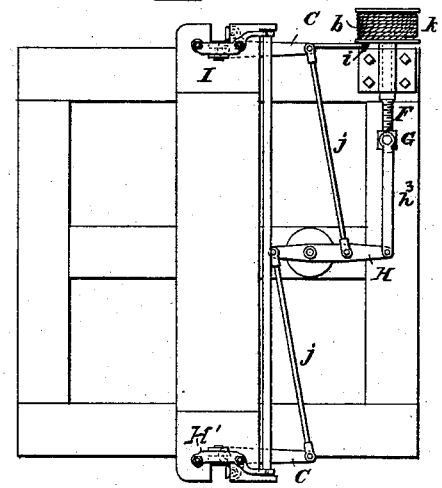
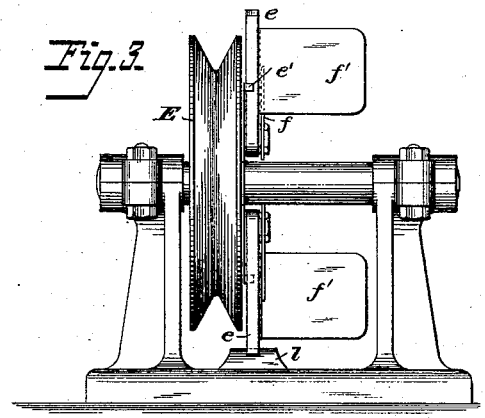

UNITED STATES PATENT OFFICE.

CYRUS W. BALDWIN, OF CHICAGO, ILLINOIS.

GOVERNOR FOR ELEVATORS.

SPECIFICATION forming part of Letters Patent No. 261,652, dated July 25, 1882.

Application filed June 6, 1882. (No model.)

*To all whom it may concern:*

Be it known that I, CYRUS W. BALDWIN, a citizen of the United States, and a resident of Chicago, Cook county, Illinois, have invented certain Improvements in Governors for Elevators, of which the following is a specification.

My invention relates to that class of safety apparatus in which the safety-brakes are operated through the medium of a rope traveling with the cage and clamped when the speed becomes excessive; and my invention consists of simple but effective devices for arresting the rope, and also of means for arresting the cage should one only of the suspension-ropes give way, as fully set forth hereinafter.

In the drawings, Figure 1 is a side view, showing the rope, car, and its appliances and governor. Fig. 2 is an inverted plan of Fig. 1, and Fig. 3 is an edge view of the governor.

The car may be constructed and operated by steam, air, or water power in any suitable manner, and with the same are combined the usual hand-rope for moving the valve, and brakes of any suitable character.

I have shown, to illustrate my invention, brake-levers C C, attached to a lever, H, by rods $j$, the lever H connected to a link, $h^3$, carrying a pivoted nut, G, through which extends a screw, F, turning in bearings on the car and carrying a drum, $k$, round which is wound the operating-rope $b$.

At the top of the well, or in any other suitable position, is placed the governor, consisting of a grooved pulley, E, to one side of which are pivoted arms $e\ e$, each arm being connected to a spring, $f$, that tends to hold the arm inward against a stop, $e'$. Round the pulley E passes the brake-operating rope $b$, the other end of which is connected to a weight, W; but an endless rope passing round pulleys at the top and bottom of the well may be used. At any point adjacent to the periphery of the pulley is secured a catch-plate, $l$. The arms $e$ are so connected that during the ordinary movements of the machine they will lie within the circumference of the pulley; but on any undue increase of speed they will fly out beyond the periphery, and upon one of them striking the plate $l$ will arrest the motion of the pulley, the rope $b$ being then held stationary. As the rope $b$ ceases to travel with the cage it unwinds from the drum $k$, and the revolution of the latter and its screw-shaft F applies the brakes and arrests the motion of the cage, the nut G holding the clamps firmly in the position to which they are set, even should the rope break. It will be seen that the arms $e$ are pivoted and arranged so that their free ends shall be forward in the direction in which the pulley rotates when the cage descends, so that they will be very sensitive to any change in speed and be thrown out instantly should it increase. To impart increased sensitiveness I extend blades $f'$ from the arms, which meet with increased resistance from the air as the speed of the pulley increases, and tend to throw the arms outward.

Each suspension-rope $g$ is connected to a frame inclosing the cage, and consisting, as usual, of a cross-bar, $h^2$, and side rods, $h'$, and the rods at each side of the cage extend through a lever, H', pivoted by a pin, $x$, to a bracket, I, beneath the cage. The connections of the lever and rods will permit the lever to rock slightly, and are such as to maintain the lever normally in a horizontal position, with one end extending into a notch, $y$, in a vertical lever, J, hung to the bracket I, as shown. A spring-arm, $m$, connected to the upper end of the lever J, extends through bearings to the back of the drum $k$, and by contact with a stop-pin, $i$, on said drum prevents it from turning until on an undue increase of speed the friction upon the rope $b$ becomes so great as to bend the spring-arm and permit the stop-pin to escape therefrom. Should either of the cables or its attachments break (and it is almost impossible for both to break simultaneously) the strain will come upon the other and tilt the lever H', its end being brought against one of the inclined faces of the notch $y$, and thereby vibrating the lever J, so as to draw back the arm $m$ away from the stop-pin $i$. The weight W now descends, drawing upon the rope $b$ and revolving the drum $k$ until the brakes are applied and the car stopped.

I do not limit myself to the precise devices for releasing the drum upon the breaking of one of the suspension cables or ropes, as other releasing appliances may be used, and the devices will of course be changed with a change in the character of the brake appliances.

I claim—

1. The within-described governor device for elevators, consisting of a pulley, arms pivoted thereto, springs connected to said arms, and a stop-plate arranged to be struck by said arms when thrown beyond the periphery of the pulley, substantially as specified.

2. The combination, with the elevator and its operating-rope $b$, of the pulley E, arms $e\ e$, pivoted to the pulley, with their free ends in the direction in which the pulley revolves when the cage is descending, springs, and stop-plate, substantially as set forth.

3. The combination of the pulley, stop, arms, and blades $f'$, substantially as specified.

4. The combination, with the brakes, governor, and rope $b$, of the screw-shaft F, drum $k$, and nut G, connected to the brake-arms, substantially as specified.

5. The combination, with a cage, of independent suspension-cables, brakes, and appliances constructed to apply the brakes upon the breaking of either cable, substantially as set forth.

6. The combination, in an elevator, of suspension-cables connected independently to a lever, H, upon opposite sides of its pivot-point, and appliances constructed and operating to apply the brakes upon the tilting of the lever, substantially as set forth.

7. The combination of the cage, independent suspension-cables, lever H, drum $k$, rope $b$, weight W, governor E, and notched lever J, spring-rod $n$, and stop-pin $i$ on the drum, substantially as set forth.

In testimony whereof I have signed my name to this specification in the presence of two subscribing witnesses.

CYRUS W. BALDWIN.

Witnesses:
L. J. L. KENT,
HOLMES HOGE.